(12) United States Patent
White

(10) Patent No.: US 6,170,616 B1
(45) Date of Patent: Jan. 9, 2001

(54) BRAKE REACTION PIN

(75) Inventor: Hollis Newcomb White, Hopkinsville, KY (US)

(73) Assignee: White Hydraulics INC, Hopkinsville, KY (US)

( * ) Notice: Under 35 U.S.C. 154(b), the term of this patent shall be extended for 0 days.

(21) Appl. No.: 09/252,767

(22) Filed: Feb. 19, 1999

Related U.S. Application Data

(63) Continuation-in-part of application No. 09/103,631, filed on Jun. 23, 1998.

(51) Int. Cl.[7] .................................................. F16D 55/36
(52) U.S. Cl. ......................... 188/71.5; 188/170; 192/70.2
(58) Field of Search ................. 188/71.5, 72.3, 188/170; 192/70.19, 70.2

(56) References Cited

U.S. PATENT DOCUMENTS

| | | | |
|---|---|---|---|
| 4,263,991 | * 4/1981 | Morgan et al. | 188/170 |
| 4,286,694 | * 9/1981 | Wiseman, Jr. et al. | 188/71.5 |
| 4,356,901 | * 11/1982 | Koehler et al. | 192/70.2 |
| 4,548,306 | * 10/1985 | Hartz | 188/72.3 |
| 4,615,418 | * 10/1986 | Atwell | 188/170 |
| 4,802,564 | * 2/1989 | Stodt | 188/71.5 |
| 4,805,744 | * 2/1989 | Pringle | 188/71.5 |
| 5,085,295 | * 2/1992 | Wautelet et al. | 188/73.2 |
| 5,186,284 | * 2/1993 | Lamela et al. | 188/71.8 |
| 5,388,679 | * 2/1995 | Inoue et al. | 192/35 |
| 5,389,049 | * 2/1995 | Mabee | 188/72.3 |
| 5,495,927 | * 3/1996 | Samie et al. | 192/70.12 |
| 5,850,895 | * 12/1998 | Evrard | 188/264 A |

\* cited by examiner

Primary Examiner—Christopher P. Schwartz
(74) Attorney, Agent, or Firm—Lightbody & Lucas

(57) ABSTRACT

A brake assembly for a shaft including a series of brake disks interconnected to the shaft with the interleaved reaction disks interconnected to a fixed surrounding part by accurately positioned pins.

32 Claims, 4 Drawing Sheets

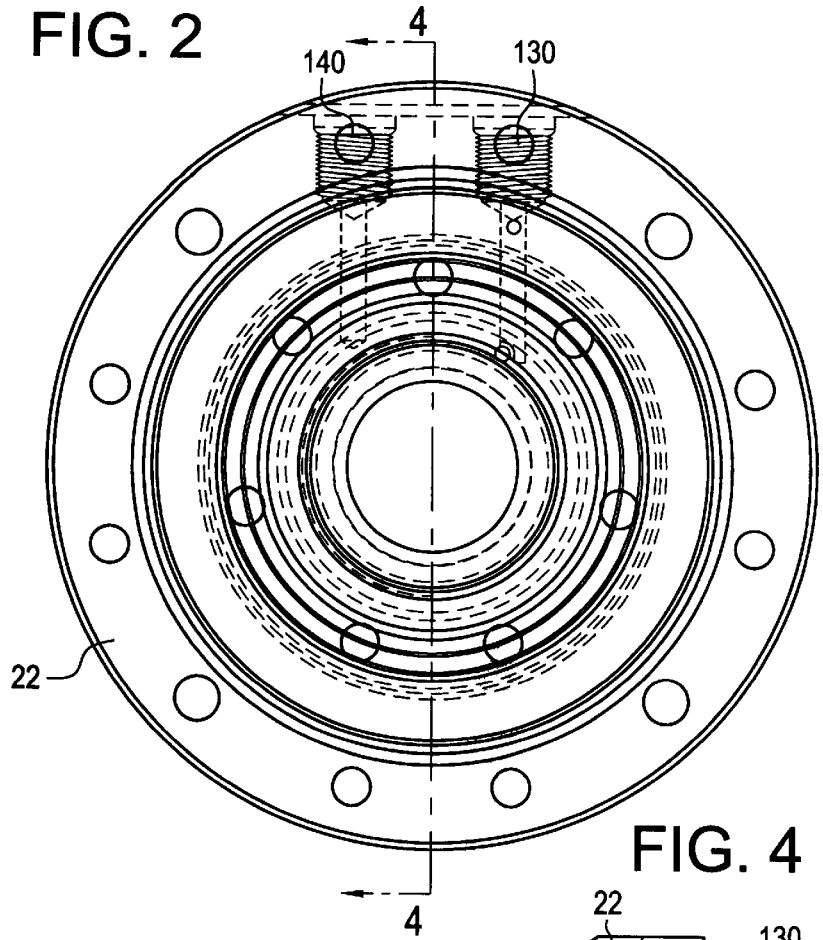
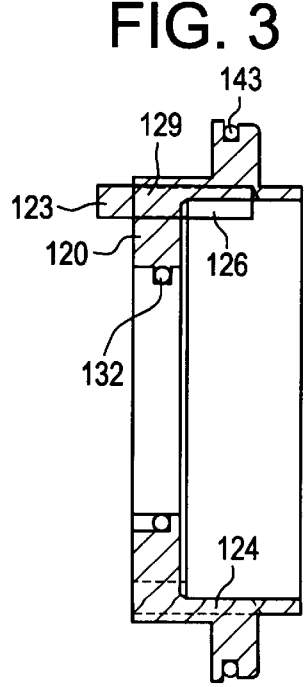
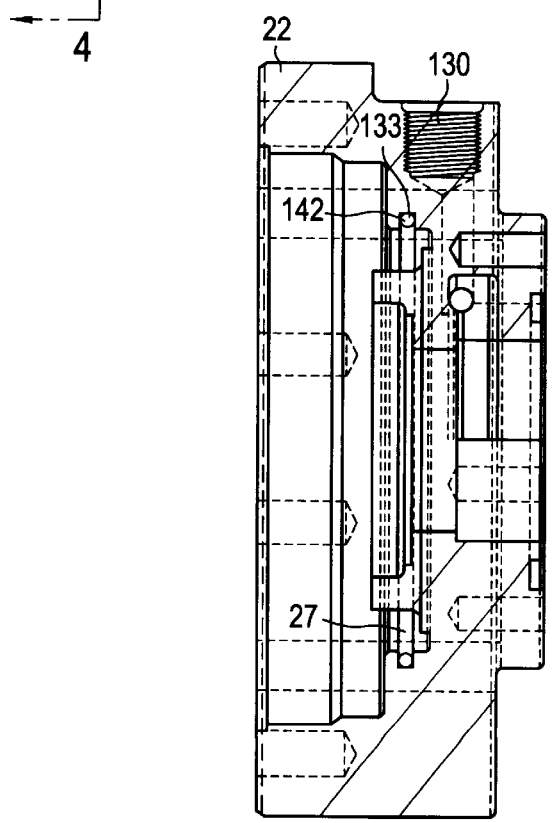

BRAKE REACTION PIN

This application is a Continuation-in-Part application of U.S. Ser. 09/103,631 filed Jun. 23, 1998 entitled Spring Brake, the contents of which are included by reference.

FIELD TO WHICH THE INVENTION RELATES

This invention relates to a brake reaction pin utilized in a combination axle support and brake mechanism.

BACKGROUND OF THE INVENTION

Brake shafts have been utilized to control power from a positive mechanism (such as a motor) to a negative mechanism (such as a brake, pump, or retarder). In some instances, the same shaft has been utilized for a secondary purpose, such as functioning as an axle for a wheel or a rotary support for a secondary member (such as a winch spool). A number of these devices utilize interleaved disk brakes, typically with a substantially triangular spline to spline interconnection to their respective members, shaft, or housing. This spline interconnection typically requires machining or some other additional operation to form the splines. In addition, the tolerances of the splines allow for a measure of movement of the shaft in respect to the housing when the brake is engaged.

One application for brake shafts is as a combined axle and brake mechanism for scissorlifts. An example of this is the hydraulically released spring applied brake mechanism of Genie Industries of Redmond, Wash. However, the cost of this particular unit is sufficiently high that most manufactures of scissorlifts use live axles with separate drum brake mechanisms taken from a small automobile instead. These axle assemblies take hours of time to assemble and install. Others use a split-axle in the back, with the brakes being either thereon or on the motor drive systems of the front wheels.

SUMMARY OF THE INVENTION

It is an object of this invention to allow for a multiple use brake reaction pin.

It is an object of this invention to reduce the cost of brakes.

It is an object of this invention to increase the strength of brakes.

It is an object of this invention to manufacture higher quality brakes.

It is an object of this invention to lower the tolerances in brakes.

It is a further object of this invention to increase the speed of manufacture of brakes. other objects and a more complete understanding of the invention may be had by referring to the drawing in which:

DESCRIPTION OF THE DRAWINGS

FIG. 2 is an end view of the back of the housing of the device of FIG. 1 taken substantially along lines 2—2 therein;

FIG. 3 is a side view of an actuation piston utilized with the brake of FIG. 1;

FIG. 4 is a side view of the back of the housing utilized with the brake actuation piston of FIG. 3;

DETAILED DESCRIPTION OF THE INVENTION

Figure 1:
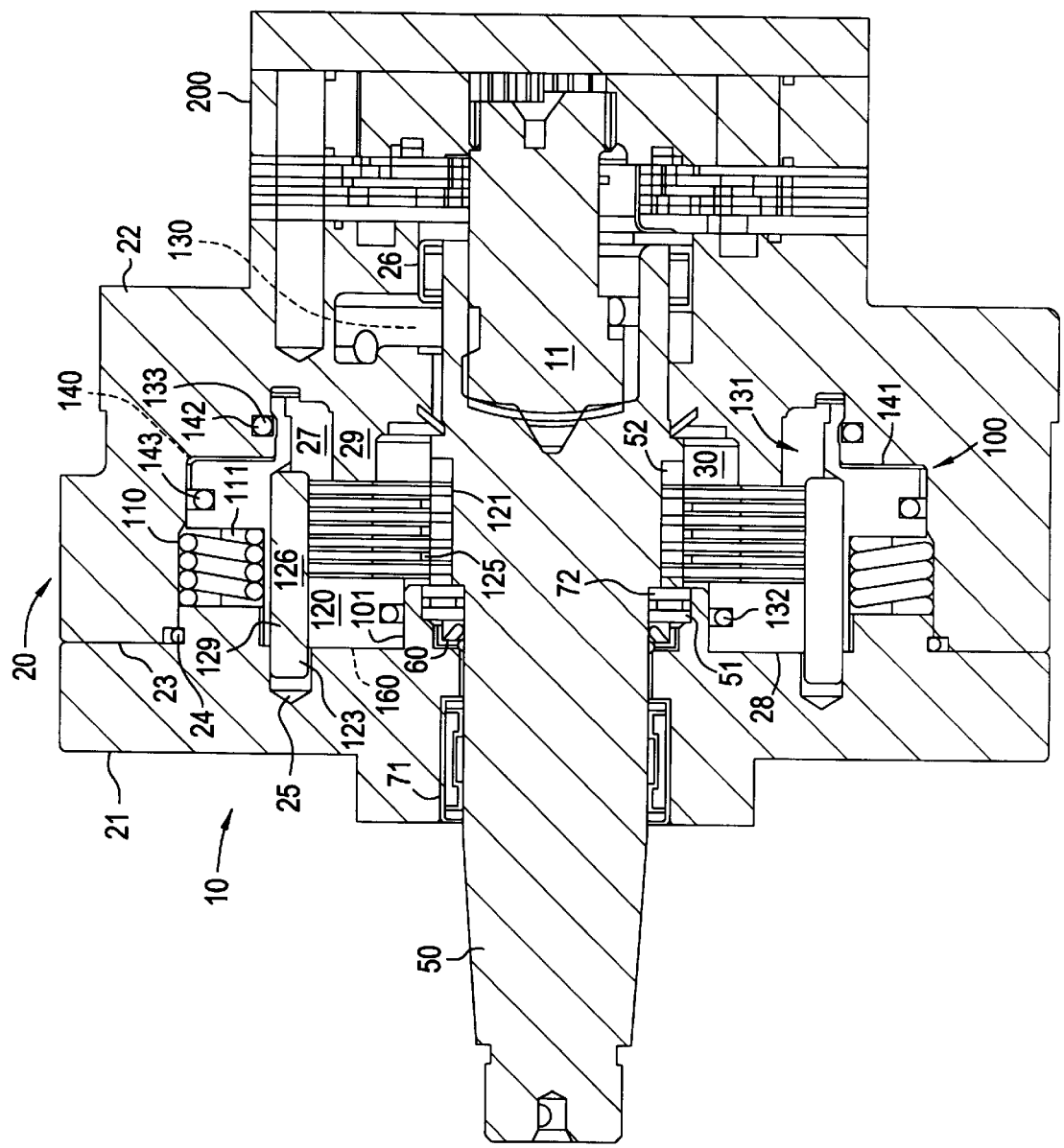
FIG. 1 is a longitudinal cross-sectional view of a spring operated hydraulically released brake and axle support device in which the brake reaction pin is utilized.

This invention relates to a reaction pin 126 for a brake assembly 10. This reaction pin 126 locates the reaction disks in a radially fixed position in respect to a surrounding part, thus allowing any braking forces to be absorbed by such part.

The example brake assembly 10 has a housing 20, a shaft 50 and a brake mechanism 100.

The housing 20 serves to rotatively support the shaft 50 and anything attached thereto to an associated vehicle (not shown) as well as providing a location for the brake mechanism 100. The particular housing disclosed is of two-part construction having a front 21 and a back 22 with a cavity 30 therebetween.

The front 21 of the housing has substantially all its machined surfaces formed therein from one side thereof. This facilitates the alignment of the machined surfaces thereby reducing the cost of the brake assembly 10 as well as increasing service life. The major concentric surface which is machined in the front of the housing shown include the area surrounding the oil seal 60 and the surface 101 on one side of the activating piston for the brake mechanism 100. The additional lateral end 23 of the front 21 of the housing where it abuts the back 22 of the housing is also machined. The remainder of the surfaces of the front 21, except for the front bearing 71, have clearances to any adjoining part, thus removing the necessity of any machining thereof.

In respect to the back 22 of the housing, the major areas which are machined include the surfaces adjoining the cavity seals 142, 143 (later described), the surface of the main housing seal 24 and the rear bearing 26. A reduced area 27 in combination with aggregate clearances about such reduced area 27 eliminates the need to machine most of the inner-surface of the back 22 of the housing while also providing for an integral reservoir for the oil which is contained in the cavity 30 of the housing.

The shaft 50 is rotatively supported to the housing 20 by front and back bearings, in the particular embodiment disclosed a main needle bearing 71 and the inner needle bearing 26.

The oil seal 60 is located directly next to the main bearing 71 in a seal cavity formed in the housing 20.

On the other side of the main oil seal 60 a small protrusion 51, extending inwardly of the inner rest of the front of the housing, locates the seal 60 axially in the housing while also aiding in retaining the shaft 50 in location in respect to the remainder of the brake assembly 10 via the thrust bearing 72 off of the end of a shoulder on the drive shaft 50.

The particular shaft 50 is interconnected to a brake mechanism 100 and optionally, an additional drive mechanism 200.

In the preferred embodiment disclosed, the drive mechanism 200 is a modification of the White Model RE Rotor Valved Motor, disclosed with a more complete explanation in White U.S. Pat. No. 4,697,997, the contents of which are incorporated by reference. Other example drive mechanisms include the Eaton Rotary Valve Motors (disclosed in U.S. Pat. No. 3,572,983), the TRW Orbiting Valve Motors (disclosed in U.S. Pat. No. 3,452,680) and Shaft Valved Gerotor Motors (disclosed by example in U.S. Pat. No. 4,285,643). Vane motors or piston motors could also be utilized. If no drive is provided, a plate (not shown) would be utilized to seal the opening in the back 22 of the housing, thus preventing internal contamination while also allowing for the selective pressurization of the later described deactivation cavity 131. The White Hydraulics' Closed Center Hydraulic Power Unit (such as that in White U.S. Pat. No. 4,877,383), an electric motor, or other power unit could also be utilized, the contents all of which are incorporated by reference.

The brake mechanism 100 preferably surrounds the shaft 50 located between the two bearings 71 and 26. This allows the bearings to primarily absorb any radial forces on the shaft 50.

The brake assembly shown is spring activated and hydraulic pressure released. If desired, alternate activation mechanism can be utilized such as pressure applied spring released brakes, mechanical activation, and other systems.

In the embodiment disclosed, a number of actuation springs 110 are located substantially equally spaced about the shaft 50 within a concentric activation cavity in the front 21 of the housing. The springs are retained radially and circumferentially located in position by small pockets 111 formed in the piston 120 of the brake mechanism 100. Alternately the activation springs 110 could be located by pins in either or both of the front 21 of the housing or the piston 120, or other means.

The piston 120 is the major operating device for the disclosed embodiment. Typically, the actuation springs 110 bias the piston 120 against the brake disks 121, 125 and the opposite side 29 of the housing 20, thus to prevent the rotation of the shaft 50. However, upon selective interconnection of either the port 130, 140 to a source of high pressure, a deactivation cavity 131, 141 is pressurized, thus overcoming the force of actuation spring 110 so as to release the brake. Two seals 132, 133 located between the piston and the housing 10 (seal 132 to the front 21 and seal 133 to the back 22) retain the pressure in deactivation cavity 131 while two seals 142, 143 located between the piston 120 and the back 22 of the surrounding housing 20 retain the pressure in the deactivation cavity 141, thus allowing for the deactivation of the piston 120. Note in the embodiment disclosed the seals 133, 142 are coextensive. This reduces the cost and complexity of the device while also facilitating the geometry of the operative parts of the device as later described.

The deactivation cavities have many unique properties.

For example, there are two cavities, either or both of which have sufficient force to release the braking mechanism. Further these cavities can accomplish this function connected with an allied device fluid connection (for example the two fluid ports of a gerotor pressure drive mechanism 200 as shown in the preferred embodiment), to one or the other, or even independently thereof. Further, both parallel or series connections could be utilized. This provides for a very flexible brake.

Additional example since one cavity is located radially outward of another cavity, the braking mechanism is shorter than it otherwise would be. This also allows for multiple use of parts (i.e., the piston 120 and seal 133). This further simplifies the construction and operation of the brake. The location of the pins 126 overlapping both cavities further shorten the unit.

A further example, the pin 126 serves both to interconnect the reaction disks 125 to a surrounding member (the piston 120) while in addition preventing the rotation of the piston 120 (and thus the reaction disks 125) in respect to the housing 20. This further simplifies the construction of the brake.

As previously set forth, the ports 130, 140 may or may not be coextensive with the pressure and return ports of an associated hydraulic drive mechanism. If coextensive (as shown), operation of the hydraulic drive mechanism 200 in either direction would automatically release the brake. This coextensive connection could be provided externally or internally of the housing (internally shown).

If the ports 130, 140 are not coextensive (or if no drive mechanism is provided), a separate control of the brake is possible by one, the other, or both parts. This provides for a very flexible brake. Unused parts could be eliminated if desired (contrast FIG. 1 with FIG. 8 for example).

The deactivation movement of the piston 120 is typically stopped by the surface 28, thus preventing any damage to the activation springs 110. The extension 28 also aids in continued piston alignment in respect to the deactivation cavities 131, 141.

The rotation of the shaft 50 is selectively prevented by the force of the spring 110 on a set of brake and reaction disks 121, 125. These disks 121, 125 are interleaved with alternating disks interconnected to the shaft 50 or the housing 20 by two innovative methods.

The brake disks 121 as shown have a series of projections or tabs 122 extending into the inner hole 123 of the brake disk 121. These tabs 122, preferably 3 to 15 in number, cooperate with a series of tabways 52 extending inwardly in the outer circumference of the shaft 50. The cooperation between the tabs 122 and the tabways 52 solidly interconnect the brake disk 121 to the shaft for rotation therewith. This construction is simple while at the same time providing for an accurate interconnection between the brake disk 121 and the drive shaft 50, this in contrast with the more conventional triangular splines normally used for this interconnection. Further, the significant width of the tabs 122 efficiently pass the torque between the brake disk 121 and the shaft 50 on which the disks 21 are mounted.

Figure 7:
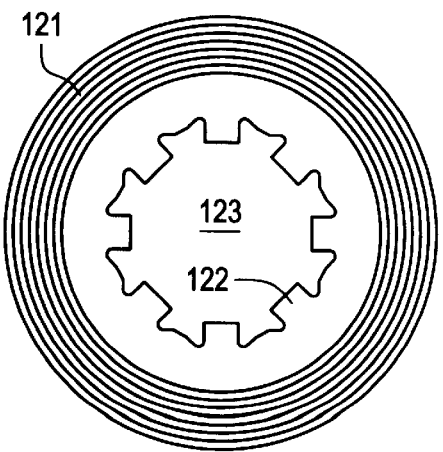
FIG. 7 is a view of the drive plate utilized with the brake of FIG. 1; and, FIG. 8 is a cross sectional view of a brake incorporating an alternate embodiment of the mechanism of FIG. 1.

In the particular preferred embodiment disclosed, the brake disk 121 is substantially 4" in diameter having a 1.9" inner hole 123 formed therein. There are six tabs 122 some 0.38" long and 0.15" thick leaving a spacing of 1.59" between opposing tabs. The disks themselves are 0.072" thick. There are six tabs 122 and four brake disks 121 utilized in the preferred embodiment disclosed. The spline of FIG. 7 have a pressure angle of substantially 30° (20° to 40° range) and an inner extension of 0.07". Both sides of the disks 121 included 0.5" band of friction material such as sintered bronze.

The drive shaft 50 and the tabways 52 therein are sized to substantially match the dimensions of the inner hole 123 and the and the tabs 122 respectively with a 0.01" to 0.015" radial and circumferential clearance.

Alternating with the brake disks 121 are a series of reaction disks 125. These reaction disks are interconnected with a fixed surrounding part in a non-rotative manner. The number of reaction disks is preferably substantially the same as the number of brake disks. Since any rotation of the reaction disks 125 in respect to the housing 20 would allow for some lash, it is preferred that the reaction disks 125 are supported solidly against rotation to a fixed surrounding part, typically directly or indirectly to the housing. In the preferred embodiment, this solid connection is provided by a series of a number of pins 126 pressed into holes in a part about the reaction disks 125. These pins 126 interconnect with corresponding grooves 127 cut into extended areas 128 about the outer diameter of the reaction disk 125. The number of pins and grooves can vary as necessary or desired. Three to eight are preferred; four are shown. This construction allows for the accurate location of the reaction disk 125 in respect to the adjoining part via four accurately drilled holes for the pins 126, thus for more precisely locating the reaction disk 125 while avoiding brake lash. Further, this is accomplished without the necessity of machining the adjoining part of the brake assembly 10 about the disks 125 thus keeping cost at a minimum.

In the particular preferred embodiment disclosed, the reaction disk 125 is substantially 4" in diameter having a 2.2" inner hole formed therein. There are four extended areas 128 some 0.17" long extending off of the outer circumference of the disk 125. Four 0.31" semi-circular grooves 127 are centered on the extended areas 128 at a 4.35" diameter bolt circle. The disks themselves are approximately 0.07" thick. They are coated with a reaction material such as iron phosphate on both sides.

The pins are sized to substantially match the grooves 127. The opening in the adjoining part containing the disks has a diameter slightly greater than the 4.35" diameter of the disks.

The adjoining part with which the pins 126 cooperate to retain the brake disks 125 in position can be the activating piston 120, the housing 10, or other part.

In cooperating with the activating piston 120 (FIG. 1), the pins 126 serve both to affix the reaction disks 125 to the piston 120 and also serve to retain the activating piston 120 (and hence the reaction disks 127) in radial position in respect to the housing 10.

In respect to the former, a semi-circular notch 124 in the piston 120 captures the pins 126 against any circumferential movement, thus tying the reaction disks 125 to such piston 120. This interconnection is strengthened by the pins 126 axial extension 129 within the main body of the piston. This extension 129 further ties the pins 126 to the piston 120 by holding the pins 126 in the notch 124 as well as resisting any angular shifting of the pins 126 in respect to the piston 120.

In respect to the latter, the small extension 123 of the pin 126 extending beyond the piston 120 on the opposite longitudinal side of the piston 120 from the brake disks 125 cooperates with holes 25 in the housing 10 to locate the piston 120 and prevent rotation of the piston 120 (and thus the reaction disks 125) in respect to the housing. For the former the pins 126, being captured in the holes 25 in the housing, do not allow rotary movement of the brake disks 121 in respect to the housing. For the latter the holes 25 are slightly (0.01–0.05") larger in diameter than the pins 126. This allows some motion between the pins 126 and the housing 10 in line with the longitudinal axis of such pins 126. This allows for the unimpeded actuation/deactuation movement of the piston 120 along such axis.

In the embodiment shown, as the pins 126 are subjected to relatively fluidic high pressures (for example during the pressurization of the deactivation cavity 131), the pins 126 are sealed to the piston 120 at least somewhere in the extension 129. This prevents fluid flow by therebetween. In the example shown, this seal is provided by utilizing a press-type fit between the pin 126 and piston 120 (a 0.312" diameter pin is pressed into a 0.281" hole). A separate seal or other fluid retention means could also be utilized in addition/instead of this press fit type seal if desired and/or appropriate.

Figure 5:
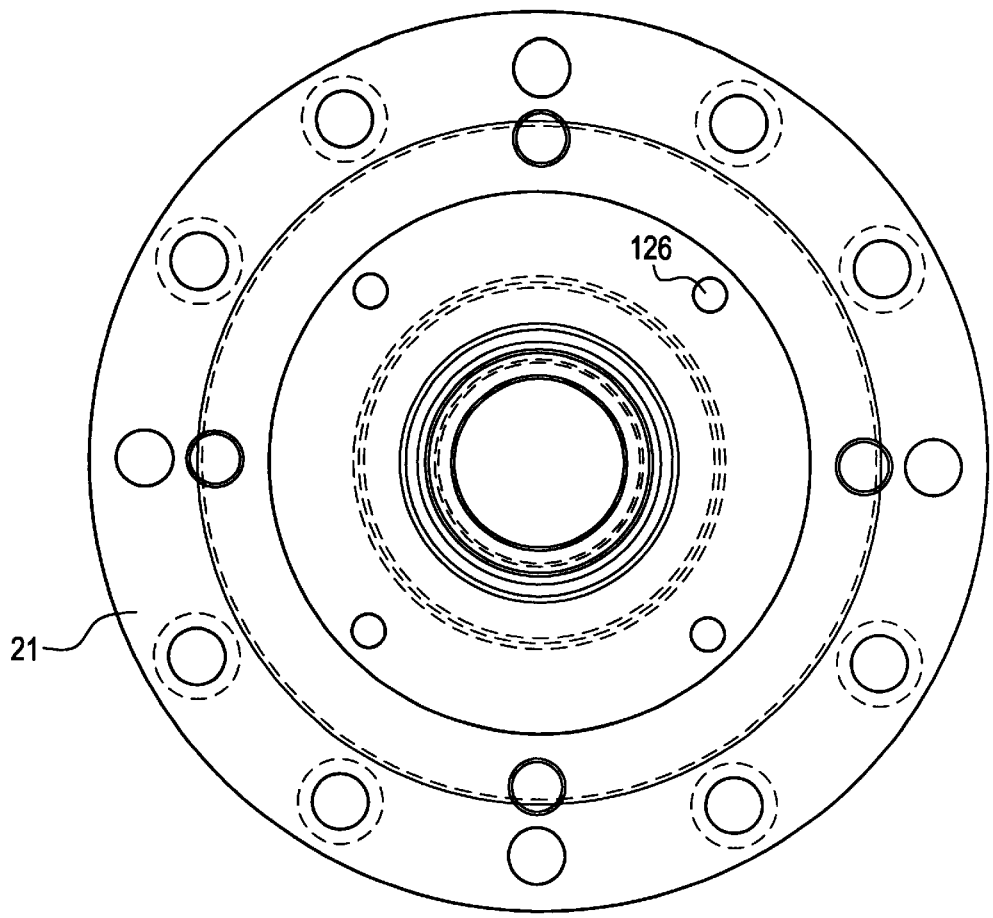
FIG. 5 is a view of the front of the housing of FIG. 1 utilizing reaction pins.
Figure 6:
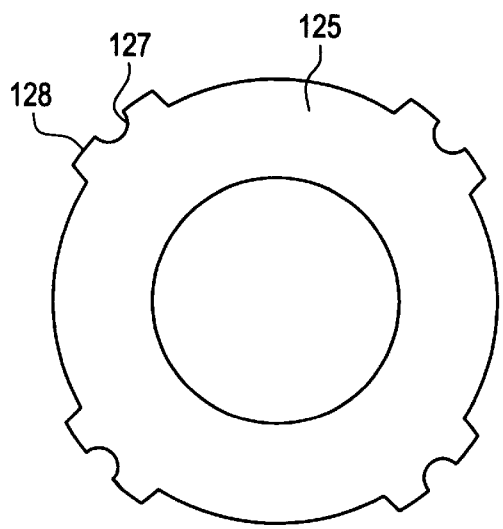
FIG. 6 is a view of the reaction plate utilized with the reaction pins of FIGS. 1 and 5.

In cooperating with the housing 10 (FIG. 5), the pins 126 serve to affix the reaction disks 125 directly to the housing 10. The pins 126 otherwise function as previously described.

The particular pins 126 disclosed are some 1.625" in length and 0.313" in diameter, as previously set forth, these pins are pressed into four 0.281" diameter holes in the piston on a 4.35" diameter bolt circle. The free ends 123 of the pins 126 extend some 0.3" beyond the face of the piston 120. The ends 123 of the pins 126 themselves are located in four 0.35" diameter holes in the front 21 of the housing, again on a 4.35" diameter bolt circle. The pins 126 thus cooperate with the housing to allow axial but not rotary movement of the piston 120 (and with it the reaction disks 125 to release the brake).

Figure 8:
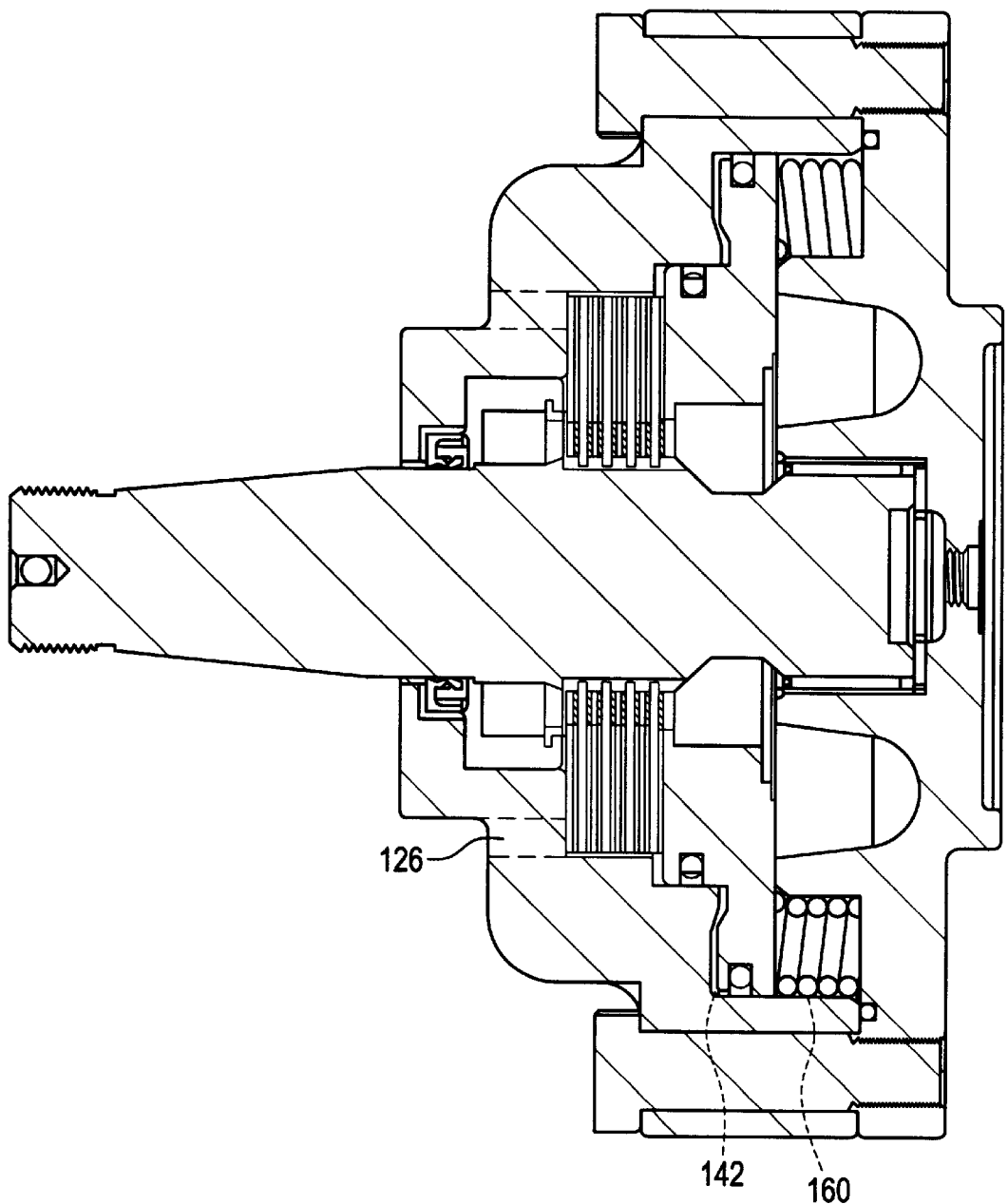

The pins 126 could also cooperate directly with the housing 20 to hold the reaction disks 125 in position (FIG. 8). This is appropriate in a simplified type device, for example a single port 142 pressure deactivated brake.

In either example, the particular brake mechanism 100 disclosed in this application is a "wet" brake. By this it is meant that the cavity 30 containing the brake mechanism contains hydraulic fluid. This cools the brake mechanism in addition to facilitating the removal of the residue of the friction material which is inevitable in any braking operation. Preferably, in a single sided device there is an internal vent or connection 140 provided to an overflow mechanism thus as to allow for breathing of the fluid in the cavity 28 behind the piston 120 and also to release of any pressurized fluid which might leak from the actuation cavities into such area. This interconnection also allows for the fluid fluctuation which is inherent in the device upon the movement of the piston 120 in the routine operation of the device.

Although the invention has been described in its preferred form with a certain degree of particularity, it is to be understood that changes can be made deviating from the invention as hereinafter claimed.

What is claimed is:

1. In a brake mechanism having a brake disk pack having an outer surface, a moveable selectively operable activating part having a body with an inner surface, a housing and a rotatable shaft, the improvement of the moveable activating part having its body located radially outside of the brake disk pack with its inner surface radially surrounding the brake disk pack, connect means to radially connect the outer surface of the brake disk pack to the inner surface of the body of the activating part, and prevent means to prevent the rotation of the activating part in respect to the housing.

2. The brake mechanism of claim 1 characterized in that said connect means includes pins, said pins being connected to one of the activating part or the brake disk pack, grooves, said grooves being in the other of the activating part or the brake disk pack, and said pins being in said grooves.

3. The brake mechanism of claim 2 characterized in that said prevent means includes said pins, and said pins extending off of the activating part into holes in the housing.

4. The brake mechanism of claim 3 characterized in that said pins are located in notches in the inner surface of the activating part.

5. The brake mechanism of claim 4 characterized in that the activating part has two opposite longitudinal sides with said connect means being located on the opposing longitudinal side of the activating part from the prevent means.

6. The brake mechanism of claim 5 characterized by the addition of means to seal the pin to the activating part between said connect means and said prevent means.

7. The brake mechanism of claim 2 characterized in that the brake disk pack has extended portions extending at the outer surface thereof, and said grooves being located in said extended portions.

8. The brake mechanism of claim 2 characterized in that said pins are located in notches in the inner surface of the activating part.

9. The brake mechanism of claim 1 characterized by the inclusion of activating springs, and
said activating springs extending between said moveable activating part and the housing radially surrounding said moveable activating part.

10. The brake mechanism of claim 9 characterized in that said activating springs at least partially radially surround the brake disk pack.

11. The brake mechanism of claim 9 characterized in that said activating springs fully radially surround said moveable activating part.

12. The brake mechanism of claim 1 characterized by the inclusion of activating springs, and
said activating springs extending between said moveable activating part and the housing radially outward of the brake disk pack.

13. The brake mechanism of claim 12 characterized in that said activating springs at least partially radially surround the brake disk pack.

14. The brake mechanism of claim 1 characterized in that said moveable activating part is a piston,
said piston and the housing defining a cavity, and means to pressurize said cavity to manipulate the brake mechanism.

15. The brake mechanism of claim 1 characterized in that said body of said moveable activating part fully radially surrounds the brake disk pack.

16. In a brake mechanism having a shaft rotatable in respect to a housing, the rotation of the shaft controlled by selectively engageable first and second brake disks non-rotatively connected to the housing and shaft respectively,
the improvement of an activating piston, said activating piston having a body, said activating piston being in the housing with said body thereof radially between the housing and the brake disks, said activating piston being selectively axially moveable in respect to said housing,
pins, said pins being connected to one of said activating piston or the first brake disk,
grooves, said grooves being located in the other of said activating piston or the first brake disk, said pins being located in said grooves of said other of said activating piston or first brake disk respectively radially between said one of said activating piston and the first brake disk,
said pins drivingly interconnecting to said grooves to non-rotatively interconnect the first brake disk to said activating piston through a radial connection therebetween, and
prevent means to prevent the rotation of said activating piston in respect to the housing.

17. The brake mechanism of claim 16 characterized in that said prevent means includes said pins, and said pins extending off of the activating piston into holes in the housing.

18. The brake mechanism of claim 17 characterized in that said pins are located in notches in the inner surface of the activating piston.

19. The brake mechanism of claim 18 characterized in that the activating piston has two opposite longitudinal sides with said connect means being located on the opposing longitudinal side of the activating piston from the prevent means.

20. The brake mechanism of claim 19 characterized by the addition of means to seal the pin to the activating piston between said connect means and said prevent means.

21. The brake mechanism of claim 16 characterized by the inclusion of activating springs, and
said activating springs extending between said moveable activating piston and the housing radially surrounding said moveable activating piston.

22. The brake mechanism of claim 21 characterized in that said activating springs at least partially radially surround the brake disk pack.

23. The brake mechanism of claim 21 characterized in that said activating springs fully radially surround said moveable activating piston.

24. The brake mechanism of claim 16 characterized in that the brake disk pack has extended portions extending at the outer surface thereof, and said grooves being located in said extended portions.

25. The brake mechanism of claim 16 characterized in that said pins are located in notches in the inner surface of the activating piston.

26. The brake mechanism of claim 16 characterized in that said body of said moveable activating piston fully radially surrounds the brake disk pack.

27. In a brake mechanism having a shaft rotatable in respect to a housing, the rotation of the shaft controlled by selectively engageable interleaved first and second brake disks,
the second brake disks being non-rotatively connected to the shaft,
the improvement of an activating piston, said activating piston having a body with an inner surface, said body of said activating piston being located radially outward of the first brake disks between such brake disks and the housing,
prevent means, said prevent means preventing the rotation of said activating piston in respect to the housing,
pins, notches, said notches being in said inner surface of said activating piston, said pins being in said notches in said inner surface of said activating piston,
the first brake disks having outwardly extended portions,
grooves, said grooves being located in said outwardly extended portions of the first brake disks, said pins being located in said grooves, said pins drivingly interconnecting to the first brake disks by said grooves to non-rotatively interconnect the first brake disks to said activating piston via said pins through a radial interconnection therebetween,
said pins having portions extending out of said activating piston on one longitudinal side thereof,
holes, said holes being in the housing, said extended portions of said pins being in said holes to prevent the relative rotation of said activating piston to said housing, and
control means, said control means being operable to engage and disengage the first and second brake disks to selectively brake the shaft.

28. The brake mechanism of claim 27 characterized by the inclusion of activating springs, and
said activating springs extending between said moveable activating piston and the housing radially surrounding said moveable activating piston.

29. The brake mechanism of claim 28 characterized in that said activating springs at least partially radially surround the brake disk pack.

30. The brake mechanism of claim 28 characterized in that said activating springs fully radially surround said moveable activating piston.

31. The brake mechanism of claim 27 characterized in that said body of said moveable activating piston fully radially surrounds the brake disk pack.

32. In a brake mechanism having a shaft selectively rotatable in respect to a housing, the rotation of the shaft controlled by selectively engageable first and second brake disks non-rotatively connected to the housing and shaft respectively, the brake mechanism selectively operated by a moveable activating piston with a body having an inner surface,

- the brake mechanism characterized by the activating piston being located radially between the first brake disks and the housing with its body surrounding such first brake disks, pins,
- the first brake disk having outwardly extended portions,
- grooves, said grooves being located in said outwardly extended portions of the first brake disk, said pins being located in said grooves of said outwardly extended portions of the first brake disk,
- notches, said notches being located in the inner surface of the moveable activating piston radially outward of said outwardly extended portions of the first brake disk, said pins also being located in said notches,
- said pins drivingly interconnecting said grooves to said notches in a radial manner to non-rotatively interconnect the first brake disks to the moveable activating piston,
- activating springs, said activating springs extending between said moveable activating piston and the housing radially surrounding said moveable activating piston, and
- prevent means, said prevent means to prevent the rotation of the activating piston in respect to the housing.

* * * * *